I. COOPER.
COUPLING RING.
APPLICATION FILED JULY 25, 1910.
1,000,992.
Patented Aug. 22, 1911.
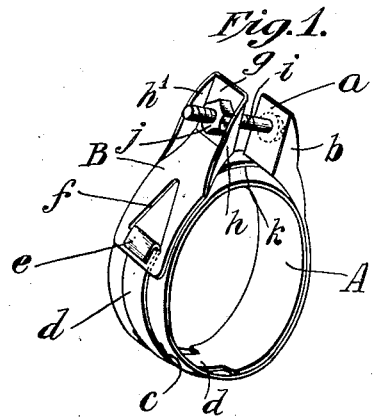
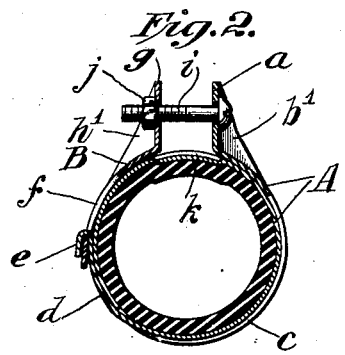
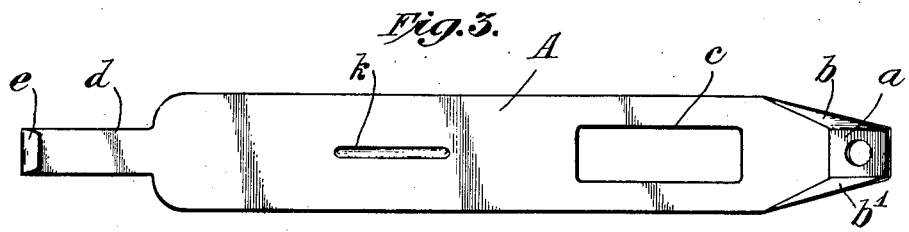
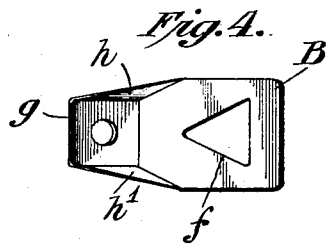
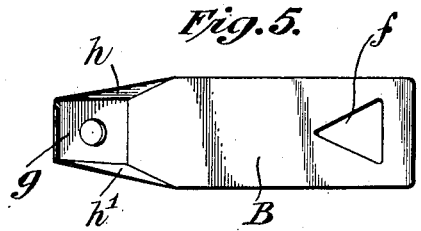
Attest:
O. B. Mitchell
Aaron Ginsburg
Isidor Cooper Inventor:
by Frank T. Wentworth
his Atty.

UNITED STATES PATENT OFFICE.

ISIDOR COOPER, OF NEW YORK, N. Y.

COUPLING-RING.

1,000,992.

Specification of Letters Patent.

Patented Aug. 22, 1911.

Application filed July 25, 1910. Serial No. 573,730.

*To all whom it may concern:*

Be it known that I, ISIDOR COOPER, a citizen of the United States, residing in the borough of Brooklyn, in the city of New York, county of Kings, and State of New York, have invented certain new and useful Improvements in Coupling-Rings, of which the following is a specification, reference being had therein to the accompanying drawings, which form a part thereof.

My invention relates to coupling rings and more particularly to a type thereof adapted for use to unite a flexible hose to a rigid fitting.

The main object of the invention is to provide a coupling ring which may be readily and cheaply produced, and which may be contracted in diameter in a manner to insure sufficient clamping action of the hose to form a perfectly tight joint without likelihood of a loss of the clamping action through the vibration of the fitting and coupling.

A further object is to provide a coupling which may be readily applied to the hose end after it has been attached to the fitting.

A still further object is to provide a coupling ring which may be readily adapted to fit hose of different diameters thus giving a considerable range to a ring and avoiding the expense attached to the production of a large number of dies for making the various sizes of rings.

A still further object is to provide a coupling ring comprising two separable parts adapted to be united to form a continuous surface engaging the hose, thus facilitating the manufacture of the ring, and its application to the hose.

A still further object is to provide a bipart coupling ring, one part of which will be of a fixed diameter, and the other part of which is interchangeable with other parts to permit the production of rings of different diameters at a small cost of equipment.

A still further object is to provide a coupling ring adapted to be clamped upon a flexible base by drawing the ends of a continuous band together, wherein that portion of the band adjacent to the ends will be reinforced in a manner to prevent the buckling of the band between said ends, and the resultant formation of a channel through which leakage can occur. And a still further object is to provide a coupling ring of this character which will possess the desired flexibility to permit it to be readily applied to and contracted upon a hose, while possessing sufficient rigidity adjacent to the ends thereof to withstand the stress upon said ends in contracting the diameter of the ring.

The invention consists in a coupling ring comprising a plurality of separable sections one of which has an opening adjacent to one end thereof and is lapped upon itself with the other end passed through said opening, the opposite ends of said section being respectively provided with a perforated flange, and with a coupling member, the other said section being segmental in shape with its opposite ends provided with a coupling member adapted to coöperate with the coupling member on the first named section, and with a perforated flange adapted to be oppositely disposed to the flange on said other member, and take up means adapted to pass through and engage both of said flanges; and in such other novel features of construction and combination of parts as are hereinafter set forth and described, and more particularly pointed out in the claims hereto appended.

Referring to the drawings:—Figure 1 is a perspective view of an assembled coupling ring; Fig. 2 is a vertical section through said ring, said ring being shown as clamped upon a hose section; Fig. 3 is a view of the rolled section straightened out; Fig. 4 is a detail view of one short length interchangeable section, and Fig. 5 is a similar view of a longer interchangeable section the use of which will increase the dimensions of the ring.

Like letters refer to like parts throughout the several views.

In the embodiment of my invention shown in the drawings, A indicates the circular, lapped member of the ring, and B the other, or interchangeable, member.

The member A consists of a continuous strip of material one end of which is turned at an angle to the strip, or radially thereof when the strip is wound, the flange so formed having a perforation therein adapted to receive the take-up member by means of which the ring is contracted to clamp it upon the hose. The flange $a$ is made narrower than the body of the ring, thus providing sufficient metal to form the reinforcing side flanges $b$, $b'$, extending from said flange to the body of the ring, said flanges being preferably formed by drawing the material of which the ring consists. Adjacent to the flange *a* is an elongated opening *c*, the opposite end of the section A being reduced for a short distance, the reduced portion *d* being of a width adapted to enter and slide freely in the slot *c*. The reduced portion *d* is provided with a coupling member *e* consisting of a hook formed by turning the end of said portion *d* upon itself. The section A being first formed in the manner described, is then rolled and lapped upon itself the reduced end *d* being inserted through the slot *c*. When so rolled, the section A presents a substantially continuous annular surface adapted to be clamped upon a flexible hose, the lap adjacent to the opening *c*, not affording any opportunity for the formation of a channel through which leakage could occur by reason of the engagement of the hose by that portion of the section A upon opposite sides of said opening.

The section B consists of a segmental section one end of which is provided with a triangular opening *f* adapted to form a coupling member coöperating with the member *e*, the triangular form of this opening being for the purpose of preserving the strength of the material in this member, and the other end of which is turned substantially radially of the arc of the section B to form a flange *g* similar in configuration and dimensions with the flange *a* and having a perforation therein so positioned as to permit the substantial alinement of these openings to adapt them to receive the take up member. The said flange *g* is of a lesser width than the body of the section B thus affording metal sufficient to form side flanges *h h'* for reinforcing said flange, said bearing flange *g* and reinforcing flanges *h h'* being formed by drawing the stock of which the section B is made. This section, B, being separable from the section A, and thus interchangeable, may be made in a variety of lengths thus permitting the extension, or increase in the size of, the ring by a substitution of a longer member B for a shorter one, this extension being limited only by the length of the strip forming the section A. This arrangement has the twofold advantage of preserving a substantially uniform condition as to the take up member, and as affording a structure which may be readily constructed by reason of the ability to mechanically roll the member A.

Applicant has heretofore endeavored to produce a coupling ring made of a single continuous band of material wound upon itself and lapped intermediate the end flanges, but found that the difficulty of producing the tools necessary to produce the ring made the manufacture of such a ring practically prohibitive. With the construction shown, however, the coupling member *e* may be connected to a rotary mandrel and the section A wound upon itself a fraction over a complete turn, the said coupling member when the section is removed from the mandrel springing into the opening *c* in a position where it may be readily engaged by the interchangeable member B. The member B may be made by a simple stamping operation, thus lending economy to the production of the entire ring.

To compensate for the slight variance in the dimensions and resistance of different hose supposedly of the same diameter, the flanges *a* and *g* must be spaced apart sufficiently to permit the take up member to draw the ring, or contract it, upon any hose of a given diameter. This spacing apart of the opposed bearing flanges sometimes results in a tendency of the inner lap of the member A buckling between said flanges in a manner to form a channel through which leakage may occur between the hose and the coupling nipple. To obviate this difficulty I form a slight depression at *k* in the body of the section A which comes adjacent to the flanges *a g* which will have the twofold effect of tending to prevent the buckling of the material at this point through the reinforcement thereof and cause the depressed portion to bite into the hose to an extent to avoid leakage in case of any slight buckling notwithstanding such reinforcement.

The take up member consists of an ordinary screw bolt *i* adapted to pass through the perforations in the flanges *a* and *g* and engage a nut *j* of dimensions sufficiently great to engage the side flanges *h h'* or *b b'* of the section A or B, so as to prevent the turning of said nut with the turning of the screw.

A coupling ring made as herein described has the advantage that it may be readily removed from and applied to a hose while it is on the coupling nipple by reason of the short length of the section A.

When it is desired to apply the ring, the section A is uncoiled and the ends thereof sprung apart sufficiently to permit them to pass over the hose. When the ends are released, they will by reason of the resiliency inherent to the metallic stock of which the section is made, spring together, the coupling member or hook *e* automatically passing through the opening *c*. A section B of the desired length is then attached relative to the section A by interlocking the hook *e* and the opening *f*. This brings the flanges *a g* substantially parallel to each other with the perforations therein in substantial alinement. The bolt *i* is then passed through said perforations and the nut *j* so positioned as to receive said bolt end. The said bolt is then turned to diminish the diameter of the ring formed by the two sections A, B, and clamp said ring upon the hose coupling sufficiently tight to prevent leakage between it and the coupling nipple.

If it be found that the member B used is not of a length sufficient to permit the ring to properly encircle the hose, it is merely necessary to substitute a longer section B thus permitting the variance in the diameter of the ring to adapt it to hose of different sizes.

It is not my intention to limit the invention to the precise details of construction shown in the accompanying drawings, it being apparent that such are largely matters of design and may be varied without departing from the spirit and scope of the invention.

By the construction herein described I provide a coupling ring wherein one member may be made upon a single set of tools to cover a considerable range of different sizes of couplings, the size of the coupling being controlled by an interchangeable member which may be readily substituted, at the point of use, thus materially simplifying the production of the article. Furthermore, the construction of the ring is such as to permit its production at a small cost while reducing the number of tools required to produce the full line of coupling rings of different diameters.

Having described my invention, what I claim as new and desire to have protected by Letters Patent, is:—

1. A coupling ring comprising a plurality of separable sections, one of which has an opening adjacent to one end thereof and is rolled and lapped upon itself with the other end passed through said opening, the opposite ends of said section being respectively provided with a perforated radial flange and with a coupling member, the other said section being segmental in shape with its opposite ends provided respectively with a coupling member adapted to coöperate with the coupling member on the first named section, and with a perforated radial flange adapted to be oppositely disposed to the flange on said other member, and take up means adapted to pass through and engage both of said flanges.

2. A coupling ring comprising a plurality of separable sections one of which has an opening adjacent to one end thereof and is rolled and lapped upon itself with the other end passed through said opening, the opposite ends of said section being respectively provided with a perforated radial flange, and reduced and provided with a coupling member adapted to pass through said opening, the other said section being segmental in shape with its opposite ends provided respectively with a coupling member adapted to coöperate with the coupling member on the first named section, and with a perforated radial flange adapted to be oppositely disposed to the flange on said other member, and take-up means adapted to pass through and engage both of said flanges.

3. A coupling ring comprising a plurality of separable sections one of which has an opening adjacent to one end thereof and is rolled and lapped upon itself with the other end passed through said opening, one end of said section being formed into a radially projecting flange having reinforcing side flanges, and the other end of said section being provided with a coupling member, the other said section being segmental in shape, with its opposite ends provided respectively with a coupling member adapted to coöperate with the coupling member on the first named section, and with a perforated radial flange adapted to be oppositely disposed to the flange on said other member, and take-up means adapted to pass through and engage both of said flanges.

4. A coupling ring comprising a plurality of separable sections, one of which has an opening adjacent to one end thereof and is rolled and lapped upon itself with the other end passed through said opening, the opposite ends of said section being respectively provided with a perforated radial flange and with a coupling member, and said section being provided with a depression adapted to be positioned below and adjacent to said flange, the other said section being segmental in shape with its opposite ends provided respectively with a coupling member adapted to coöperate with the coupling member on the first named section, and with a perforated radial flange adapted to be oppositely disposed to the flange on said other member, and take-up means adapted to pass through and engage both of said flanges.

5. A coupling ring comprising a plurality of separable sections, one of which has an opening adjacent to one end thereof and is rolled and lapped upon itself with the other end passed through said opening, the opposite ends of said section being respectively provided with a perforated radial flange and with a coupling member, the other said section being segmental in shape and having one end thereof provided with a coupling member adapted to coöperate with the coupling member on the first named section and the other end thereof being formed up to provide a radial flange and reinforcing side flanges, said radial flange being adapted to be oppositely disposed to the flange on said other member and take-up means adapted to pass through and engage both of said flanges.

6. A coupling ring comprising a plurality of separable sections one of which has an opening adjacent to one end thereof and is rolled and lapped upon itself with the other end passed through said opening, one end of said section being formed into a radially projecting flange having reinforcing side flanges, and the other end of said section being provided with a coupling member, the other said section being segmental in shape and having one end thereof provided with a coupling member adapted to coöperate with the coupling member on the first named section and the other end thereof being formed up to provide a radial flange and reinforcing side flanges, said radial flange being adapted to be oppositely disposed to the flange on said other member and take-up means adapted to pass through and engage both of said flanges.

7. A coupling ring comprising a main section consisting of a continuous coil having its opposite ends respectively formed into a bearing member and into a coupling member, a separable interchangeable member also having its opposite ends formed into a bearing member and a coupling member adapted respectively to coöperate with said first named bearing member and said first named coupling member and a take-up member adapted to coöperate with said bearing members to clamp said ring in place.

In witness whereof I have hereunto affixed my signature this 6th day of July, 1910, in the presence of two witnesses.

ISIDOR COOPER.

Witnesses:
OTTO MUNK,
T. T. WENTWORTH.